United States Patent [19]

Wellan et al.

[11] Patent Number: 5,796,602
[45] Date of Patent: Aug. 18, 1998

[54] METHOD AND APPARATUS USING A DEVICE DESCRIPTION FOR A CONVENTIONAL DEVICE

[75] Inventors: Jeffrey W. Wellan; Richard R. Sharpe, Jr., both of Lakeville; Jon D. Westbrock, Richfield, all of Minn.

[73] Assignee: Fisher-Rosemount Systems, Inc., Austin, Tex.

[21] Appl. No.: 682,833

[22] Filed: Jul. 12, 1996

Related U.S. Application Data

[63] Continuation-in-part of Ser. No. 599,371, Feb. 6, 1996.
[51] Int. Cl.$^6$ .................................................. G05B 9/00
[52] U.S. Cl. ........................... 364/130; 364/138; 364/550
[58] Field of Search .................................. 364/130, 138, 364/140.1, 550, 550.01; 340/825.06, 825.52, 825.54

[56] References Cited

U.S. PATENT DOCUMENTS

| | | | |
|---|---|---|---|
| 4,047,003 | 9/1977 | LaRocca et al. | 235/151.11 |
| 4,096,566 | 6/1978 | Borie et al. | 364/200 |
| 4,517,637 | 5/1985 | Cassell | 364/138 |
| 4,602,343 | 7/1986 | Dougherty | 364/505 |
| 4,628,437 | 12/1986 | Poschmann et al. | 364/131 |
| 4,648,064 | 3/1987 | Morley | 364/900 |
| 4,663,704 | 5/1987 | Jones et al. | 364/188 |
| 4,672,529 | 6/1987 | Kupersmit | 364/130 |
| 4,680,753 | 7/1987 | Fulton et al. | 370/85 |
| 4,774,656 | 9/1988 | Quatse et al. | 364/900 |
| 4,777,584 | 10/1988 | Pogue | 364/146 |
| 4,864,489 | 9/1989 | Yasuhara et al. | 364/131 |
| 4,910,658 | 3/1990 | Dudash et al. | 364/138 |
| 4,910,691 | 3/1990 | Skeirik | 364/513 |
| 4,918,690 | 4/1990 | Markkula, Jr. et al. | 370/94 |

(List continued on next page.)

FOREIGN PATENT DOCUMENTS

| | | |
|---|---|---|
| 0 434 288 A2 | 6/1991 | European Pat. Off. |
| 0 434 986 A2 | 7/1991 | European Pat. Off. |
| 0 560 226 A2 | 9/1993 | European Pat. Off. |
| 2 692 701 | 12/1993 | France |
| 2 713 360 | 6/1995 | France |
| 42 10 376 A1 | 10/1992 | Germany |
| WO 95/04314 | 2/1995 | WIPO |
| WO 95/09387 | 4/1995 | WIPO |
| WO 95/26527 | 5/1995 | WIPO |
| WO 96/07957 A1 | 3/1996 | WIPO |

OTHER PUBLICATIONS

Fisher, "Cornerstone Base Station," Model 2500H1, Product Data Sheet PDS 4693, *Fisher-Rosemount Systems, Inc.*, pp. 1-8 (Sep., 1995).

Fisher, "Fieldvue ValveLink Series VL2000 Software," Bulletin 62.1:VL2000, *Fisher Controls International, Inc.*, pp. 1-6 (Nov., 1995).

Fisher, "PC-Based Communications Program," ProLink Software, Product Data Sheet PS-00033, *Micro Motion, Inc.*, 2 pages (Nov., 1995).

Fisher, "Fieldvue Instruments: Opening A Window To The Proces," *Fisher Controls International, Inc.*, pp. 1-8 (1994).

Fisher, "Fieldvue Digital Valve Controller DVC5000 Series," *Fisher Controls International, Inc.*, Bulletin 62.1:DVC5000, pp. 1-12 (Jun. 1994).

(List continued on next page.)

*Primary Examiner*—Paul P. Gordon
*Attorney, Agent, or Firm*—Marshall, O'Toole, Gerstein, Murray & Borun

[57] ABSTRACT

A field device management system communicates with a smart device using a device description written in a communication protocol associated with the smart device and accesses data pertaining to a conventional or non-smart field device using a device description written in conformance with the smart device communication protocol. The field device management system uses the device description for the conventional device to initially request certain data pertaining to the conventional device from a user and then stores this data in a memory for future access.

22 Claims, 2 Drawing Sheets

U.S. PATENT DOCUMENTS

| | | | |
|---|---|---|---|
| 4,965,742 | 10/1990 | Skeirik | 364/513 |
| 4,965,880 | 10/1990 | Petitjean | 364/468 |
| 5,068,778 | 11/1991 | Kosem et al. | 364/138 |
| 5,095,417 | 3/1992 | Hagiwara et al. | 364/138 |
| 5,122,948 | 6/1992 | Zapolin | 364/131 |
| 5,146,401 | 9/1992 | Bansal et al. | 364/138 |
| 5,168,441 | 12/1992 | Onarheim et al. | 364/146 |
| 5,247,450 | 9/1993 | Clark | 364/473 |
| 5,265,005 | 11/1993 | Schmidt et al. | 364/147 |
| 5,289,365 | 2/1994 | Caldwell et al. | 364/138 |
| 5,307,491 | 4/1994 | Feriozi et al. | 395/681 |
| 5,311,451 | 5/1994 | Barrett | 364/550 |
| 5,319,751 | 6/1994 | Garney | 395/442 |
| 5,333,114 | 7/1994 | Warrior et al. | 364/550 |
| 5,365,423 | 11/1994 | Chand | 364/140 |
| 5,412,643 | 5/1995 | Kogure | 370/24 |
| 5,459,867 | 10/1995 | Adams et al. | 395/651 |
| 5,465,364 | 11/1995 | Lathrop et al. | 395/681 |
| 5,485,400 | 1/1996 | Warrior et al. | 364/550 |
| 5,486,998 | 1/1996 | Corso | 364/152 |
| 5,497,316 | 3/1996 | Sierk et al. | 364/140 |
| 5,586,324 | 12/1996 | Sato et al. | 395/652 |
| 5,613,123 | 3/1997 | Tsang et al. | 395/651 |

OTHER PUBLICATIONS

Fisher, "Fieldvue Digital Valve Controller DVC5000 Series Remotely Accessible Information," *Fisher Controls International, Inc.*, Bulletin 62.1:DVC5000(S1), pp. 1–2 (Jun. 1994).

Fisher, "Fieldvue Digital Transducer DT4000 Remotely Accessible Information," *Fisher Controls International, Inc.*, Bulletin 62.1:DT4000(S1), pp. 1–2 (Jun. 1994).

Fisher, "Type VL1000 Fieldvue Valve Link," *Fisher Controls International, Inc.*, Bulletin 62.1:VL1000, pp. 1–2 (Jun. 1994).

Fisher, "Fieldvue Digital Transducer Type DT4000," *Fisher Controls International, Inc.*, Bulletin 62.1:DT4000, pp. 1–12 (Jun. 1994).

Fisher, "Type HF100 Fieldvue Hart Filter," *Fisher Controls International*, Form 5340, pp. 1–6 (Dec. 1993).

Fisher, "Hart Communicator Manual for Fieldvue Instruments," *Fisher–Rosemount*, Form 5345, pp. 1–40 (Apr. 1995).

Fisher, "Fieldvue Digital Valve Controller Type DVC5000 Series," *Fisher–Rosemount*, Form 5335, pp. 1–38 (Jun. 1995).

Fisher, "Fieldvue Digital Transducer Type DT4000," *Fisher–Rosemount*, Form 5334, pp. 1–24 (Jun. 1995).

ISP, "InterOperable Systems Project (ISP) Device Description Services (DDS) User's Guide," ISP–94–110, Rev. 1.0, 54 pages (Jun. 1994).

ISP, "InterOperable Systems Project Fieldbus Specification Device Description Language," *ISP Foundation*, pp. 1–101 (Dec. 1993).

Leeney, "Instrument Remotely Verifies Valve's Stem Position," *Chemical Processing*, Form 8238, pp. 1–2 (Dec. 1993).

PCT International Search Report mailed Jun. 20, 1997, 4 pgs.

PCT International Search Report mailed Jun. 30, 1997, 4 pgs.

Arnold, et al., "Object–Oriented Design Environments in Process Control," 8131 Advanced in Instrumentation and Control 44(1989), Part 3.

METHOD AND APPARATUS USING A DEVICE DESCRIPTION FOR A CONVENTIONAL DEVICE

RELATED APPLICATION

This application is a continuation-in-part of U.S. patent application Ser. No. 08/599,371, now pending entitled "System and Method for Managing a Transaction Database of Records of Changes to Field Device Configurations," filed Feb. 6, 1996.

TECHNICAL FIELD

The present invention relates generally to field device management systems that manage field devices within a process or a plant and, more particularly, to a method of creating and using device descriptions for conventional field devices in a field device management system.

BACKGROUND ART

Typically, process plants, such as chemical refinery plants and drug manufacturing plants, include many field devices and other conventional devices which control and measure parameters within the process or which are used to implement a process. Each field device may be a control device (such as a flow valve controller), a measurement device (such as a temperature gauge, pressure gauge, flow meter, etc.) and/or any other device that affects or determines a value associated with a process. Until the past decade or so, field devices have typically been rather simple devices which were controlled either manually or electronically and which produced output readings either electronically or on a gauge connected to the device. These conventional field devices typically provide only limited information to a controller using analog or other signals indicative of the readings or measurements being made. Furthermore, other types of conventional devices, such as boilers, piping, trash cans etc., typically provide no information to a controller and/or are not connected to a controller.

More recently, so called "smart" field devices have been developed. Smart field devices are capable of digitally communicating with a process controller and/or a management system associated with the process in which the smart device is used. Smart field devices store and digitally transmit detailed, device-specific information, including calibration, configuration, diagnostic, maintenance and/or process information in addition to transmitting an analog signal indicative of the reading or measurement associated with the device. Some smart devices may, for example, store and transmit the units in which the device is measuring, the maximum ranges of the device, whether the device is operating correctly, troubleshooting information about the device, how and when to calibrate the device, etc. Furthermore, smart field devices may be able to perform operations on themselves, such as self-tests and self-calibration routines.

In order to enable digital communication with smart devices, smart devices are configured to follow one of a number of smart device communication protocols, such as the HART (Highway Addressable Remote Transducer) protocol, the Fieldbus protocol, the Modbus protocol or the DE protocol. However, other smart device communication protocols may exist or be developed in the future to support different types of smart devices.

Each smart device can be said to include one or more blocks or functional units comprising, for example, an input, an output or a control function. Each block has one or more "parameters" associated therewith. A parameter is an attribute which characterizes, affects or is somehow otherwise related to a block or a device. Parameters may include, for example, the type of a block or a device, the maximum operating or measurement range of a block or a device, the mode of a block or a device, the value of a block or a device measurement, etc. Likewise, each parameter has one or more properties associated therewith which defines or describes the information within the parameter. For example, the temperature parameter of a temperature measuring device has a label property which indicates the name of the parameter (e.g., "temperature"), a value property which indicates the value of the parameter (e.g., the actual measured temperature), and a units property which indicates the units in which the temperature value is expressed (e.g., degrees centigrade or degrees fahrenheit). A device or a block configuration comprises a set of values for each of the properties of each of the parameters associated with a device or a block.

Communication with any particular smart device is performed using a device communication protocol. Some smart device communication protocols, such as the HART™ and Fieldbus protocols, use a device description (DD) written in accordance with a device description language (DDL). A DDL is a human-readable language that provides a protocol for describing, for example, the data available from a smart device, the meaning of the data associated with and retrieved from a smart device, the methods or programs available for implementation by a smart device, the format for communicating with a smart device to obtain data and user interface information about a smart device. HART™ and Fieldbus DDL's are defined by the HART™ and Fieldbus foundations.

A DD is a file written in accordance with a communication protocol or a particular DDL which specifies all the information available about a particular type of smart device. DD's for smart devices typically specify five categories of information including: (1) identification of the parameters and/or properties associated with the device, including the types of data defining those parameters and/or properties (such as whether these parameters and/or properties are variables, arrays or records and the units associated with each); (2) commands necessary for communication with the smart device including information on how to send messages to and receive messages from the smart device; (3) user interface data such as predefined menus and displays which logically group parameter or property related data; (4) methods or programs to be run by a host device in relation to the smart device, including methods which provide information to a user in the form of instructions and/or which send messages to the smart device to implement, for example, a calibration or other routine on the smart device; and (5) utility information such as DD-writer defined groupings of parameters or properties to be used in connection with the parameter, command, user interface and method information. The actual values of parameters (which may change) are stored in a memory on the smart device and are not stored in or available from a DD.

To develop a DD source file (written in a human-readable format) for a smart device, a developer uses the DDL for the communication protocol associated with that device to describe core or essential characteristics of the device as well as to provide group-specific, and vendor-specific definitions relating to each function and special feature of the smart device, as defined by the above-identified categories of information. Thereafter, the developed DD source file may be compiled into a binary format to produce a machine-readable file or a DD object file using, for example, a tokenizer. DD object files are typically provided to a user by the device manufacturer or a third-party developer to be stored in a host system, such as a field device management system. A host system uses a DD object file for a smart device to decode and derive a complete description of the interface with the device. As used hereinafter, a DD refers to the DD source file and/or the DD object file.

A device description service (DDS) is a general software system developed and provided by Fisher-Rosemount Systems, Inc. and/or Rosemount, Inc. for automatically decoding and interpreting the DD's of smart devices. More particularly, DDS is a library of routines which, when called by a host, interprets the DD of a smart device to provide the host with information pertaining to the smart device as specified by the DD for that smart device. One extremely useful application of DDS is in providing a consistent interface between a host system and one or more smart devices having associated DD's.

Although DDS, DDL's and DD's are generally known in the art, more information pertaining to the specific function and format of DDL's, and of the Fieldbus DDL in particular, can be found in the InterOperable Systems Project Foundation's manual entitled "InterOperable Systems Project Fieldbus Specification Device Description Language" (1993). A similar document pertaining to the HART DDL is provided by the HART foundation.

Management systems have been developed to interact with one or more smart field devices to read and/or write any of the device or configuration information associated with those devices and to store data pertaining to past configurations of those devices. Such management systems typically comprise a personal computer having appropriate communication ports which allow it interconnect to, communicate with, and reconfigure a smart device. Management systems may be on-line, that is, have a hard-wired or other permanent connection with a smart device, or may be portable and capable of being periodically connected to a smart device to reconfigure that smart device. An exemplary field device management system is described in detail in co-pending U.S. patent application Ser. No. 08/599,371, entitled "System and Method for Managing a Transaction Database of Records of Changes to Field Device Configurations," filed on Feb. 6, 1996 and assigned to the assignee hereof (referred to hereinafter as the "Sharpe et al. application"), the disclosure of which is hereby expressly incorporated by reference herein.

Because management systems can communicate with smart devices, these management systems are capable of performing a wide variety of functions with respect to smart devices within a system. For example, management systems may provide users with information (e.g., values of variables or parameters) pertaining to the present or past states of a process and information about each of the smart field devices associated with or connected to a process. Management systems may also be used to enable a user to monitor a process and control the process by reconfiguring smart devices within the process as necessary.

However, field device management systems are not able to communicate with conventional devices, i.e., non-smart field devices and, thereby, have not been able to incorporate data pertaining to conventional devices into the overall management scheme without a considerable programming effort.

This incompatibility with conventional devices is significant because most processes include one or more conventional devices. In fact, it is estimated that 80 percent of the field devices used in most large-scale industrial processes are conventional devices, in part because smart devices are relatively new to the process control industry. Furthermore, most new processes will continue to include conventional devices because conventional devices are usually less expensive than smart devices. As a result, most processes are not completely supported by available field device management systems because, as noted above, these systems have, at most, a limited capability of viewing and accounting for information pertaining to all the devices within the process.

SUMMARY OF THE INVENTION

This invention provides a method of accounting for and incorporating data pertaining to conventional field devices as well as smart field devices in a field device management system. More particularly, this invention relates to a method of using device descriptions for conventional devices to allow management systems to account for conventional field devices in the same manner as these systems account for smart field devices.

According to one aspect of this invention, a method of supporting a conventional device for use with a management system that is capable of interacting with a smart device provides a device description (DD) for the conventional device. This device description is written in accordance with the device communication protocol associated with that smart device and, preferably, specifies a plurality of categories of information pertaining to the conventional device including, for example, device-specific description information, methods to be implemented on the conventional device and user interface information. The method uses the device description for the conventional device to ascertain data pertaining to at least one of the specified categories of information, stores the ascertained data in a memory and then accesses the stored data using the device description for the conventional device.

According to another aspect of this invention, a system adapted to access data pertaining to a smart device and a conventional device includes a device description for the conventional device. This device description is written in conformance with a communication protocol associated with a smart device and, preferably, specifies a plurality of categories of information associated with the conventional device. The system also includes a memory which stores data pertaining to a portion of the specified information and is programmed to access the stored data using the device description for the conventional device. The system may also include programming for communicating with the smart device using a device description associated with the smart device.

DETAILED DESCRIPTION

Figure 1:
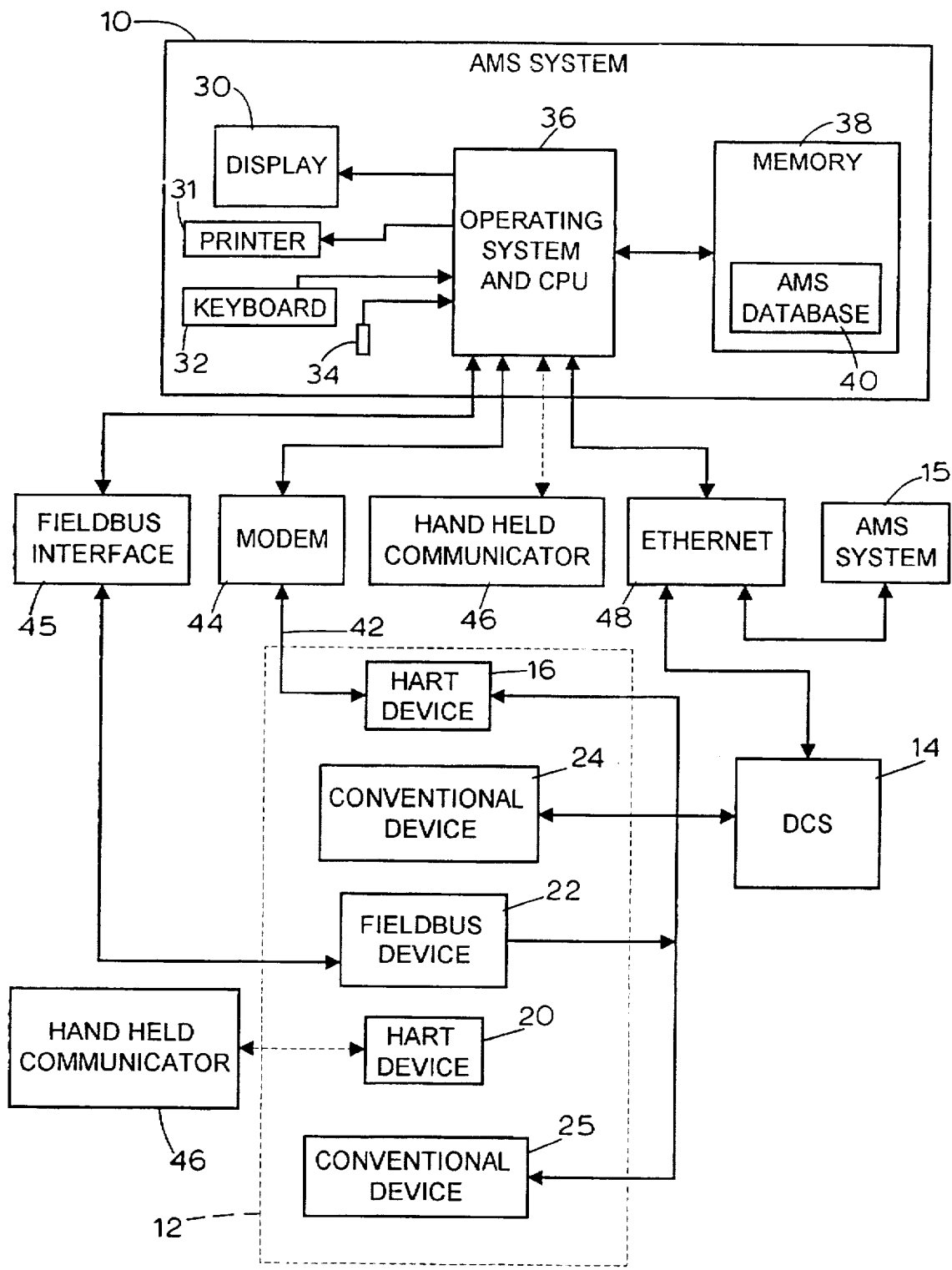
FIG. 1 is a block diagram illustrating the interconnections between a process, a distributed control system and a field device management system configured according to the present invention.

FIG. 1 illustrates a field device management system, referred to hereinafter as an Asset Management Solutions (AMS) system 10, interconnected with a process 12, a distributed control system (DCS) 14 which controls the process 12, and a further management system such as another AMS system 15. The process 12 may comprise any desired type of process, such as a manufacturing or refinery process, and is illustrated as including three smart field devices, comprising two HART devices 16 and 20 and a Fieldbus device 22. The process 12 also includes two conventional (i.e., non-smart) field devices 24 and 25. The devices 16, 20, 22, 24 and 25 are controlled in any desired manner by the DCS 14.

Generally, the AMS system 10 is a PC-based tool that includes software applications which perform field-device management tasks. The AMS system 10 integrates device management for each of the devices within the process 12 by helping users to, for example, configure, calibrate, monitor and troubleshoot any and all of the smart field devices associated with the process 12 and to account for the status of the conventional devices within the process 12.

The AMS system 10, which may comprise any type of computer or microprocessor based system, is illustrated as including a display 30, a printer 31, a keyboard 32 and a mouse 34 connected to an operating system and CPU 36. A memory 38 having an AMS database 40 is also coupled to the operating system and CPU 36. The memory 38 stores software and data used by the AMS system 10 to perform tasks related to displaying information to a user via the display 30 or the printer 31 and communicating with the smart devices 16, 20 and 22. In addition, the AMS database 40 stores device-related information which is not available from the smart devices, for example, information pertaining to past configurations of the devices, information pertaining to the conventional devices 24 and 25 and other off-line devices, such as off-line smart devices, and information pertaining to service notes including when the next service is needed, who performed service procedures, any favored replacement devices, etc. Data pertaining to off-line smart devices may be stored within the database 40 in a format identical to the format in which that data is actually stored within off-line smart devices so that, to the AMS system 10, off-line devices appear to be available through the database 40 in essentially the same way that they would be available if those devices were on-line. Likewise data pertaining to conventional devices may be stored within the database 40 in a format identical to the format in which that data would be stored in a comparable smart device so that, to the AMS system 10, conventional devices appear to be off-line smart devices.

As illustrated in FIG. 1, the smart device 16 is an on-line device which is connected to the AMS system 10 via a communication line 42 and a modem 44. The smart device 22 is an on-line device which is connected to the AMS system 10 via a Fieldbus interface 45. The smart device 20 is an off-line device which is not permanently connected to the AMS system 10. However, the smart device 20 may communicate with the AMS system 10 via a hand-held communicator and/or secondary (laptop) AMS system 46 which may be periodically connected to the smart device 20 and/or any of the other smart devices to read data from, and write data to, these smart devices. Thereafter, the hand-held communicator and/or secondary AMS system 46 may be connected to the AMS system 10 to upload data pertaining to the smart devices to which it was attached.

If desired, the operating system and CPU 36 of the AMS system 10 can be connected through, for example, an ethernet communication link 48 and/or any other network link to the DCS 14 and/or other AMS systems such as the AMS system 15.

Figure 2:
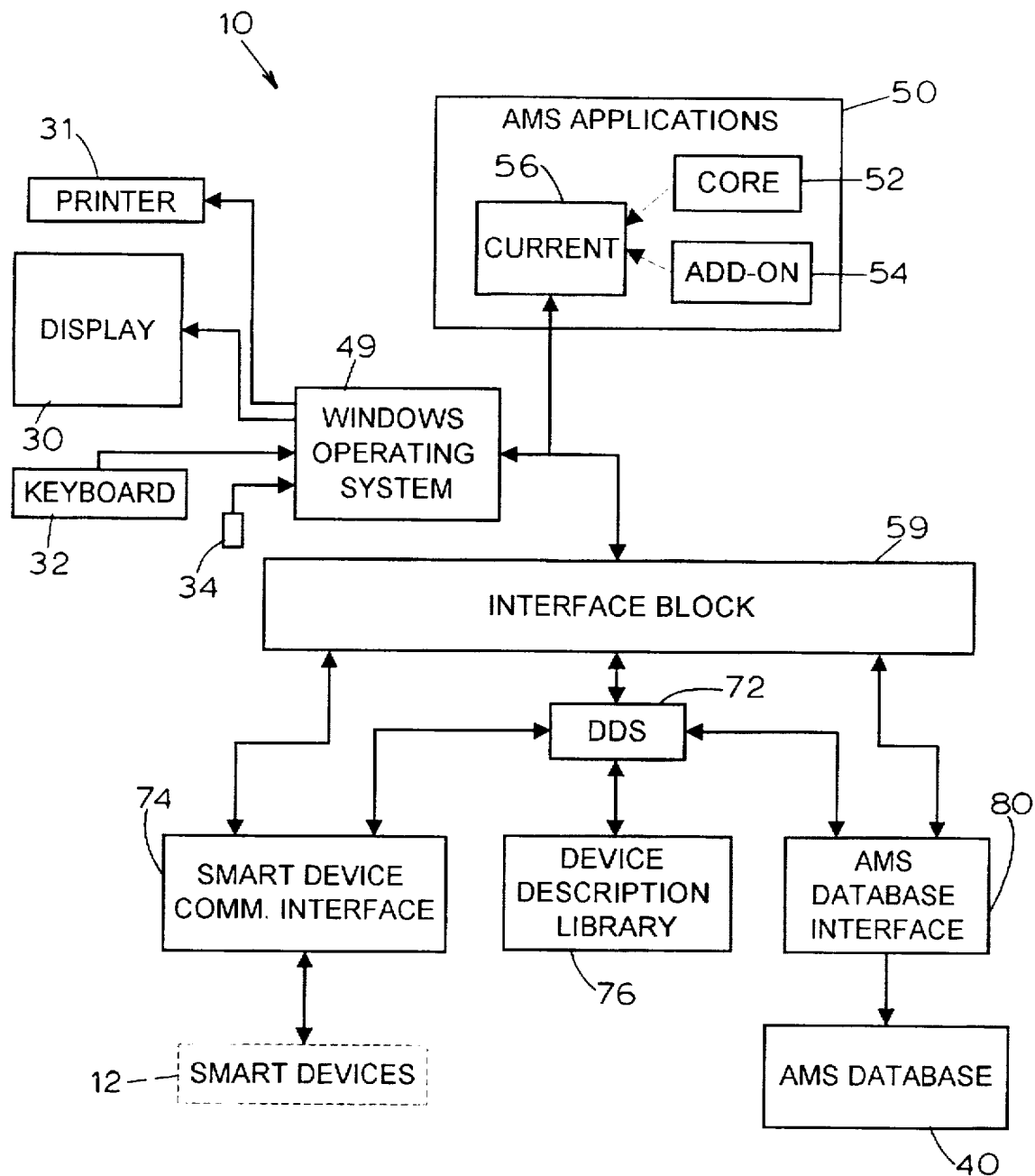
FIG. 2 is a block diagram of the management system of FIG. 1 using DD's for both conventional and smart field devices to support the conventional and smart field devices.

FIG. 2 illustrates the interconnections between various component parts of the AMS system 10, including hardware and software components, and will be used to describe how the various software components stored in the memory 38 of the AMS system 10 interact with each other.

The AMS system 10 preferably operates in a Microsoft Windows environment (such as a Windows 95™ or a Windows NT™ environment) and, therefore, includes a standard Windows operating system 49 which is used to display data and information on the display 30 and the printer 31 and to retrieve data and information from the keyboard 32 and the mouse 34. Thus, information provided to or retrieved from the Windows operating system 49 is preferably provided in a standard Windows call format of any desired type, as is known to those skilled in the art. Alternatively, the AMS system 10 could be implemented according to the present invention using any other desired Windows-based or non-Windows-based operating system format (whether or not based on a graphical user interface) including, for example, MacIntosh, Windows or IBM DOS formats.

The AMS system 10 includes a set of AMS applications 50 comprising core applications 52, which are essentially programs written by the AMS system provider to perform predetermined and frequently used operations, and add-on applications 54, which are applications developed by a user or a third-party developer and imported to the AMS system 10 to perform customized functions. Core applications may include, for example, applications which allow a user to interact with the data within the AMS database 40 and/or the smart devices within the process 12 to view the present state of one or more of the devices within the process 12, to change the configuration of one or more of the devices within the process 12, to view multiple devices in a simultaneous or sequential manner, to perform common smart device control and configuration functions, to run browsers that locate devices on the network, to monitor the status of devices and generate alarm lists, and to implement device calibration and testing routines. Other typical core applications may include configuration applications, configuration management applications, alarm scanning applications, history event-log applications, reporting applications, trend-analysis applications and diagnostic applications.

As used herein, an application refers to any software routine implemented (on the CPU 36) by the AMS system 10 which manipulates and/or displays to a user information pertaining to or about the process 12 or any information associated with the devices connected to, or associated with, the AMS system 10 and/or the process 12. The information used by an application is typically either stored in, or developed by, the smart devices within the process 12, or is stored in the AMS database 40.

During operation of the AMS system 10, a user selects one or more of the applications for execution, identified in FIG. 2 as the current application 56. Because multiple applications may be executed simultaneously by the AMS system 10, there may be multiple current applications 56. Any current application 56 may interface directly with the Windows operating system 49 to communicate with a user and may interface with a communication interface block 59 to communicate with one or more smart devices or the AMS database 40.

The communication interface block 59 communicates with the smart devices within the process 12 using a DDS block 72 and a smart device communication interface 74. The DDS block 72 is coupled to a device description library 76 which stores DD's for the smart devices and the conventional devices which are within the process 12 or which are supported by the AMS system 10. The smart device communication interface 74 uses the DDS 72 (which accesses the DD's stored in the library 76) to communicate properly with the smart devices in the process 12 so as to read information from, write information to and perform methods on the smart devices within the process 12. During operation, the DDS 72 accesses and interprets a DD associated with a device in a known manner to provide information about that device or to provide proper communication with that device.

The communication interface block 59 also communicates with the AMS database 40 using the DDS block 72 and an AMS database interface 80. The database interface 80 uses the DDS 72 to read information from and write information to the database 40. Such information may comprise past states of devices, service notes, changes made to the devices, off-line smart device and conventional device data, etc. The AMS database interface 80 is preferably an application program interface (API) of any conventional type that is specifically set up and configured for retrieving information from the database 40 according to any desired or known method. The AMS database interface 80 automatically keeps track of where and how data is stored in, and retrieved from the database 40.

Preferably, the interface block 59 includes a digital control interface (DCI) as, for example, developed by Fisher-Rosemount Systems, Inc., along with a device server and a database server to effect consistent communication with the smart devices within the process 12 and with the database 40, as described in more detail in the Sharpe et al. application. In particular, the interface block 59 uses the device server and the database server to establish an OLE layer having OLE objects which are used to communicate with the smart device communication interface 74, the DDS 72 and the database interface 80 in response to changes within the OLE objects. These OLE objects are set up and configured in accordance with an identified hierarchy of information available from and pertaining to smart devices, as described in detail in the Sharpe et al. application. The use of this OLE object layer established according to a hierarchy based on information available about smart devices enables consistent communication with the database 40 and the smart devices within the process 12, even though these devices and the database 40 use different communication protocols.

As explained in the Sharpe et al. application, the device server of the interface block 59 communicates with the smart device communication interface 74 and the DDS block 72 to effect proper communication with the smart devices within the process 12 to thereby read data from, write data to and implement methods on the smart devices within the process 12. Likewise, the database server within the communication interface block 59 communicates with the AMS database interface 80 and the DDS block 72 to effect communication with the AMS database 40 to read and write data pertaining to off-line smart devices, on-line smart devices and conventional devices. Because it is possible to have the AMS database 40 store information pertaining to, for example, values associated with off-line devices and data pertaining to changes made to on-line and off-line devices in a format which conforms to a DD format, i.e., in a format that mimics how such data is stored in on-line devices, the AMS database interface 80 may need to access the DDS 72 to determine how and what data is stored in the AMS database 40. However, information stored in the database 40 need not be stored in a DD format and, therefore, the AMS database interface 80 may also write data to, and read data from, the AMS database 40 directly.

The way in which the AMS system 10 supports smart devices is described in detail in the Sharpe et al. application. The way in which the AMS system 10 supports conventional devices is very similar to the way in which it supports off-line smart devices and will be described hereinafter. It is noted that the term conventional field device is considered to include any device or entity which cannot communicate with a host system, such as the AMS system 10 using a smart device communication protocol supported by that host system. Most conventional devices are those field devices which simply do not provide for any digital communication therewith. Although some field devices, such as the Honeywell ST3000 series of devices, provide for digital communication, these devices do not have device descriptions which support that digital communication and, therefore, are conventional with respect to a host system which does not support that digital communication. The term conventional device may also refer to smart devices which use a protocol not supported by the AMS system 10 and which, therefore, also appear to the AMS system 10 like a typical conventional device. Still further, the term conventional device may include entities not normally considered to be field devices such as, for example, trash cans, groups of instruments, switches, motors, boilers, piping, etc. Simply put, any entity that can be identified with a device I.D. and that has properties with values may be considered a conventional device.

In general, to support one or more conventional devices, a device description is written for each of the conventional devices and is stored in the device description library 76. Thereafter, the data pertaining to any particular conventional device which would normally be stored in a comparable smart device (i.e., device parameter values) are ascertained by the AMS system 10 and stored in the AMS database 40. The conventional device then appears to the current application 56 of the AMS system 10 as a smart device except that the particular parameter value data pertaining to the conventional device is stored in the database 40 instead of in a memory on the conventional device. Also, the current application 56 will not be able to communicate with the conventional device and, thus, the conventional device will appear as an off-line smart device.

Preferably, the device description for a conventional device is written in conformance with one of the smart device communication protocols supported by the AMS system 10, such as the HART or the Fieldbus communication protocol. However, device descriptions for different conventional devices or device types may be written in accordance with different smart device communication protocols or may be written in accordance with a device communication protocol specifically designed for conventional devices, as long as that protocol is supported by the AMS system 10.

To support a range of conventional devices, a device description may be made for any or each of a number of different family types of conventional devices such as pressure sensors, temperature sensors, pumps, valves, flow-type devices, thermowells, orifice plates, temperature-to-pressure transducers, temperature switches, pressure switches, relays, relief valves, etc. Although a number of different types of conventional devices have been identified herein, it is noted that a device description can be made for any desired type of device, such as any of the different family types of conventional devices identified by the Instrument Society of America, for example, or for any device or device type identified by a user.

To create a device description for any particular device or device type, information pertaining to some of the categories of information specified by DD's for smart devices is identified. Particularly, the identification of the parameters and/or properties associated with the devices within the relevant device type, including, for example, the names of parameters and properties and the types of data associated with these parameters and/or properties (such as whether the parameters and/or properties are variables, arrays or records and the units associated with each), is identified. Parameter or property information may include categories of device-specific description data including, but not limited to, the manufacturer of the device, the model and serial number of the device, the materials of construction associated with the device, measurement and error limits of the device, device tolerances, input/output information, messages and descriptions pertaining to the device, service schedules, the latest or past device readings, etc. While categories of information pertaining to device parameters are identified for a DD, the actual data defining parameter values need not be identified because this data is different for each device.

Furthermore, information pertaining to user interface data (such as predefined menus and displays which logically group parameter, property or other related data), methods or programs to be implemented by a user on the conventional device (typically in the form of a set of instructions to a user), and utility information (such as DD-writer defined groupings of parameters or attributes to be used in connection with the parameter, user interface and method information), may also be identified for a conventional device DD. While these further categories of information are typically completely specified by the DD, some of the data related to these categories may be stored in the AMS database 40.

Importantly, the DD for a conventional device will not include commands, as would a DD for a smart device, because no communication is possible with the conventional device. Also, the methods of a DD for a conventional device will have to be implemented by a user in a manner divorced from the host system, for example, manually, because the host system cannot communicate with the conventional device to command that device to perform method steps. As a result, these methods usually comprise a set of instructions to the user.

Once the categories of information for a particular family of conventional devices are identified and the specific data associated with some of those categories, such as particular methods and user interfaces, are established, a device description is written for that type of conventional device in any desired communication protocol, such as the HART or Fieldbus protocol. This conventional DD can be written in the same manner that DD's are written for smart devices, as is well known within the art.

After the DD's for each of the desired family types of conventional devices have been written in a protocol supported by the AMS system 10, these DD's are stored in the device description library 76. Thereafter, the conventional devices supported by these DD's will appear to the AMS system 10 like an off-line smart device with one notable exception. While, the AMS system 10 initially determines most of the parameter values of the device-specific description data referred to by the DD for a smart device by reading that information from the memory in the smart device, the AMS system 10, after requiring a user to identify a conventional device, must initialize the parameter values of the device-specific description information pertaining to that conventional device by, for example, requesting the user to input that device-specific description information and then storing that information in the database 40. As a result, when a user specifies that a particular conventional device is being added to the process or identifies that the AMS system 10 is to support a particular conventional device, the AMS system 10 must access the DD for that conventional device to determine what information is needed to support that conventional device and then must ask the user for the required device-specific description data or other information not provided by the DD. Such required information may include, for example, data defining the device manufacturer, the materials of construction, the device serial number, etc. The requested information is then stored in the database 40 (or any other desired database) as related to the conventional device, preferably in a manner which is identical to or similar to the manner in which such data would be stored in a comparable smart device.

Generally, when initialing a conventional device or, for that matter, a smart device, the user must also provide the host system, such as the AMS system 10, with specific data defining where that device is located within the physical process. This data, which may be in the form of, for example, a tag number or any other reference to a physical location, can be used to provide the conventional device with a unique moniker used thereafter to access the data (including reading and writing data) pertaining to that conventional device as stored in the database 40. Typically, the AMS system 10 will implement an application to initialize physical layout data as well as the parameter values for the device-specific description data required for each conventional device being supported. To perform this initialization function, however, the application must first access the DD for the conventional device being initialized to see what types of data are necessary for initialization and then must request a user to input the necessary data referred to by the DD for the conventional device. Such an initialization application and the manner of accessing a DD using the DDS 72 is considered to be well within the skill of those knowledgeable in the art and, therefore, will not be described further herein. It should be noted, however, that the required data can be entered manually by the user, can be downloaded from a different file or can be entered into the AMS system 10 in any other desired manner.

After the parameter values for the device-specific description information and any other required data for all of the supported conventional devices has been stored in the database 40, the conventional devices appear to the AMS system 10 as off-line smart devices for which a DD exists in the library 72. Thus, an application can access information pertaining to a conventional device in the same manner that the application would access information pertaining to an off-line smart device. First, the application would send a data read or write request to the communication interface block 59 using a moniker for the conventional device. The communication interface block 59 would, thereafter, access the AMS database interface 80 and/or the DDS 72 which would access the DD for the conventional device from the library 76. The database interface 80 would then use the DDS and the DD in the standard manner to read the requested conventional device information from the database 40 or to write new information thereto, e.g., in a manner similar to the way in which the database interface 80 accesses information pertaining to an off-line smart device stored in the database 40. Methods of accessing data from smart devices and the database 40 are described in more detail in the Sharpe et al. application.

In summary, once a DD for a conventional device has been created and stored in the library 72, and a conventional device using that DD has been connected to the process 12 and described to the AMS system 10 by a user, the conventional device appears to the AMS system 10 like an off-line smart device. As a result, the AMS system can rely on the smart device communication protocol for communicating with and supporting smart devices as well as supporting conventional devices. As is evident, DD's for any number of different conventional devices can be stored in the library 76 to support any number of conventional devices.

Although the information pertaining to conventional devices and smart devices can be displayed in any desired manner to a user, when using a windows format, it is preferable to use a resource file to enhance the display layout of the information pertaining to smart devices and conventional devices in a manner which resembles, for example, the graphical interface displays provided by Windows 95. Such resource files typically categorize the information specified by a DD in a manner which makes logical sense to a user and which thereby allows a user to easily find and read the information he or she desires.

While the present invention has been described with reference to specific examples, which are intended to be illustrative only, and not to be limiting of the invention, it will be apparent to those of ordinary skill in the art that changes, additions and/or deletions may be made to the disclosed embodiments without departing from the spirit and scope of the invention.

We claim:

1. A method of supporting a conventional device for use with a system that is capable of interacting with a smart device, said smart device having an associated device description written in accordance with a device communication protocol, the method comprising the steps of:

providing a device description for the conventional device which is written in accordance with the device communication protocol and which specifies information pertaining to the conventional device;

using the device description for the conventional device to ascertain data pertaining to a portion of the specified information;

storing the ascertained data; and accessing the stored data using the device description for the conventional device.

2. The method of claim 1, wherein the specified information is device-specific description information.

3. The method of claim 1, wherein the step of providing a device description includes the step of providing the device description which specifies a plurality of categories of information pertaining to the conventional device.

4. The method of claim 3, wherein one of the plurality of categories of information is device-specific description information.

5. The method of claim 3, wherein first and second of the plurality of categories of information comprise device-specific description information and methods to be implemented on the conventional device, respectively.

6. The method of claim 5, wherein a third of the plurality of categories of information comprises user interface information.

7. The method of claim 1, wherein the step of using the device description for the conventional device to ascertain data includes the step of requesting a user for the data pertaining to the portion of the specified information.

8. The method of claim 1, wherein the step of providing the device description for the conventional device includes the step of writing the device description for the conventional device in accordance with the HART communication protocol.

9. The method of claim 1, further including the step of using the device description associated with the smart device to communicate with the smart device.

10. A system adapted to access data pertaining to a smart device and a conventional device, wherein the smart device has an associated device description written in accordance with a communication protocol, the system comprising:

a device description for the conventional device written in conformance with the communication protocol associated with the smart device and specifying information associated with the conventional device;

means for storing data pertaining to a portion of the specified information; and means for accessing the stored data pertaining to the portion of the specified information using the device description for the conventional device.

11. The system of claim 10, further including means for communicating with the smart device using the device description associated with the smart device.

12. The system of claim 11, wherein the device description for the conventional device specifies a plurality of categories of information pertaining to the conventional device.

13. The system of claim 12, wherein one of the plurality of categories of information is device-specific description information and wherein the device-specific description information is the portion of the specified information.

14. The system of claim 12, wherein a first of the plurality of categories of information comprises device-specific description information and a second of the plurality of categories of information comprises methods to be implemented on the conventional device.

15. The system of claim 14, wherein a third of the plurality of categories of information comprises user interface information.

16. The system of claim 11, further including means coupled to the accessing means and to the communicating means for interpreting the device description associated with the smart device and the device description for the conventional device in accordance with the communication protocol.

17. The system of claim 16, wherein the interpreting means includes means for storing the device description associated with the smart device and the device description for the conventional device.

18. The system of claim 10, wherein the device description for the conventional device conforms to the HART communication protocol.

19. The system of claim 10, wherein the device description for the conventional device conforms to the Fieldbus communication protocol.

20. An apparatus for manipulating information pertaining to a smart device and a conventional device comprising.

first means for storing a device description for the smart device, said device description being written in conformance with a device communication protocol and specifying device-specific description information and communication information;

second means for storing a device description for the conventional device, said device description being written in conformance with a device communication protocol and specifying a plurality of categories of information pertaining to the conventional device;

a memory which stores the data pertaining to at least one of the plurality of categories of information specified by the device description for the conventional device;

means for accessing the stored data pertaining to the at least one of the plurality of categories of information using the device description for the conventional device; and means for communicating with the smart device using the device description for the smart device.

21. The apparatus of claim 20, wherein the device description for the smart device further specifies methods to be implemented on the smart device and wherein a first and a second of the plurality of categories of information specified by the device description for the conventional device comprise device-specific description information and methods to be implemented on the conventional device, respectively.

22. A method of creating a device description for a conventional device for use in a system which communicates with a smart device that has a communication protocol associated therewith, the method including the steps of:

selecting a particular type of conventional device from a number of types of conventional devices;

identifying a plurality of categories of information associated with the selected type of conventional device; and writing a device description in conformance with the communication protocol wherein the device description specifies the identified plurality of categories of information.

\* \* \* \* \*